United States Patent [19]
Herzog et al.

[11] Patent Number: 5,562,180
[45] Date of Patent: Oct. 8, 1996

[54] TREE STAND

[76] Inventors: Daniel E. Herzog, 192 Thomas Ave., Rochester, N.Y. 14617; James M. Schmeer, 297 Widgedon Landing, Hilton, N.Y. 14468

[21] Appl. No.: 429,330

[22] Filed: Apr. 26, 1995

[51] Int. Cl.⁶ .................................................. A01M 31/02
[52] U.S. Cl. .......................................... 182/187; 108/152
[58] Field of Search .................................. 182/188, 187, 182/136; 108/152; 248/231

[56] References Cited

U.S. PATENT DOCUMENTS

| | | | |
|---|---|---|---|
| 4,727,961 | 3/1988 | Dawson | 182/187 |
| 4,936,416 | 6/1990 | Garon | 182/187 |
| 5,101,934 | 4/1992 | Zumbro | 182/187 |
| 5,143,177 | 9/1992 | Smith | 182/187 |
| 5,363,941 | 11/1994 | Richards | 182/187 |
| 5,469,934 | 11/1995 | Pherigo | 182/187 |

*Primary Examiner*—Alvin C. Chin-Shue
*Attorney, Agent, or Firm*—Jaeckle, Fleischmann & Mugel

[57] ABSTRACT

A compact, lighweight and self-contained tree stand that can carry heavy loads and yet is demountable, readily assembled and disassembled, for easy transport, mounting and use, comprising a sturdy mounting bracket for secure attachment to a tree trunk or vertical post, a readily detachable platform connectable to the mounting bracket and capable of carrying a substantial load, a readily detachable seat connectable to the bracket, and means to secure the bracket to the tree trunk.

12 Claims, 3 Drawing Sheets

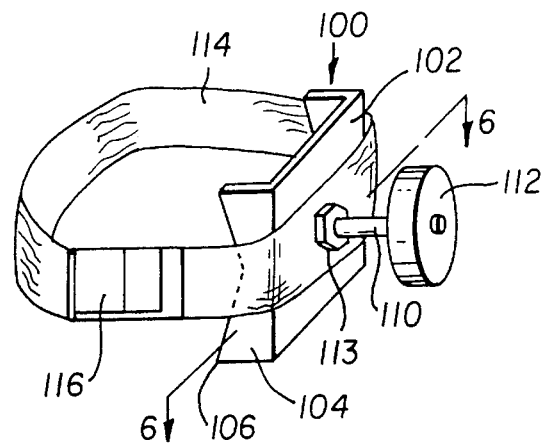
FIG. 5
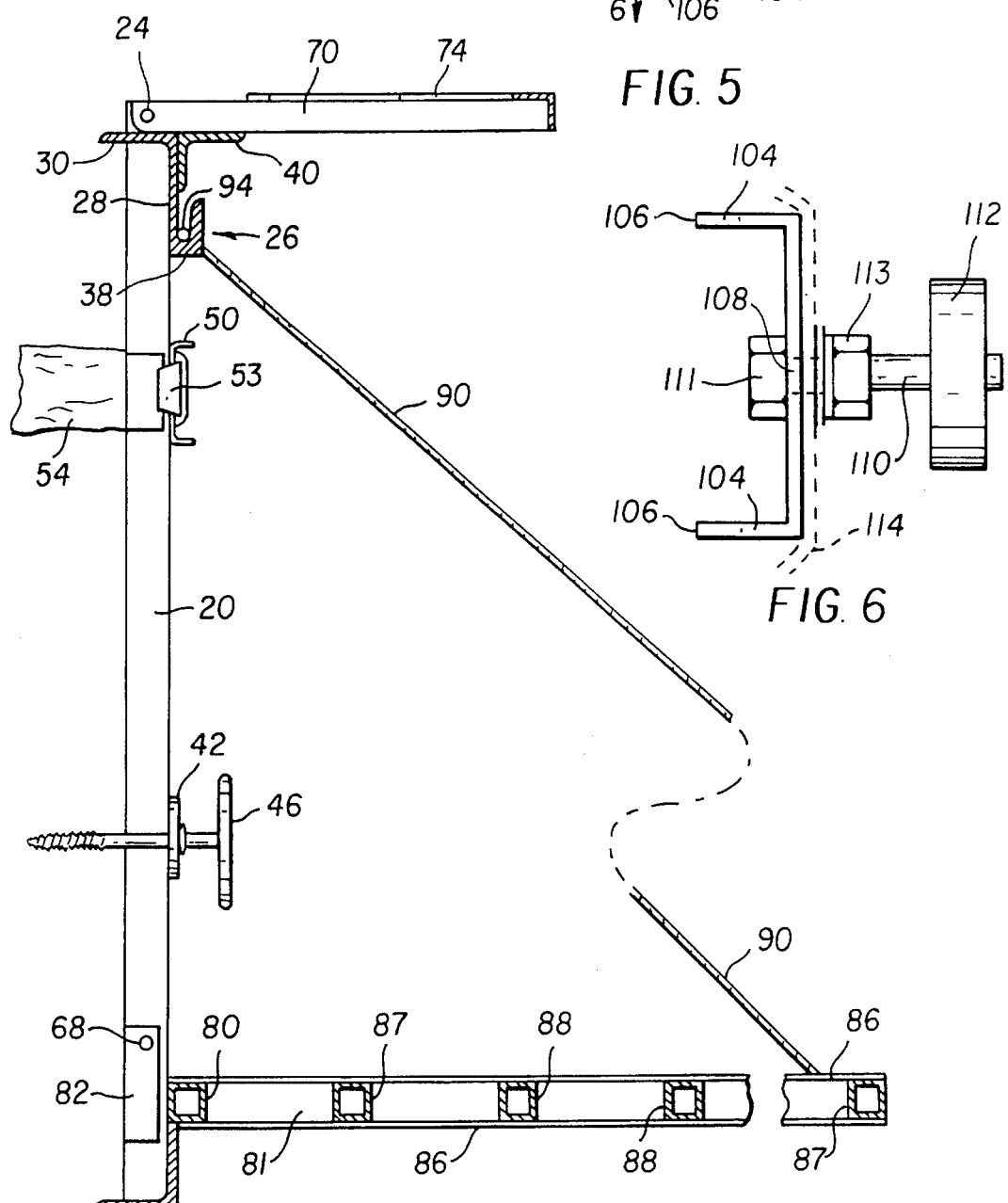
FIG. 6
FIG. 2

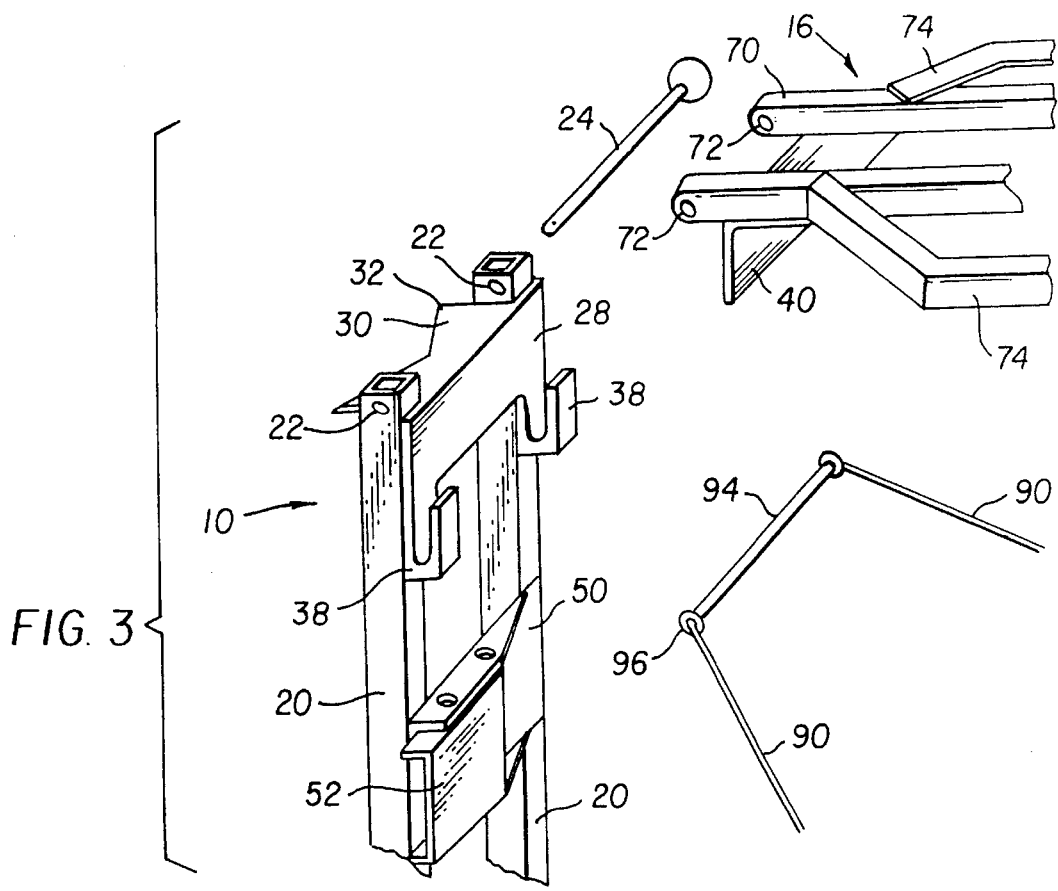
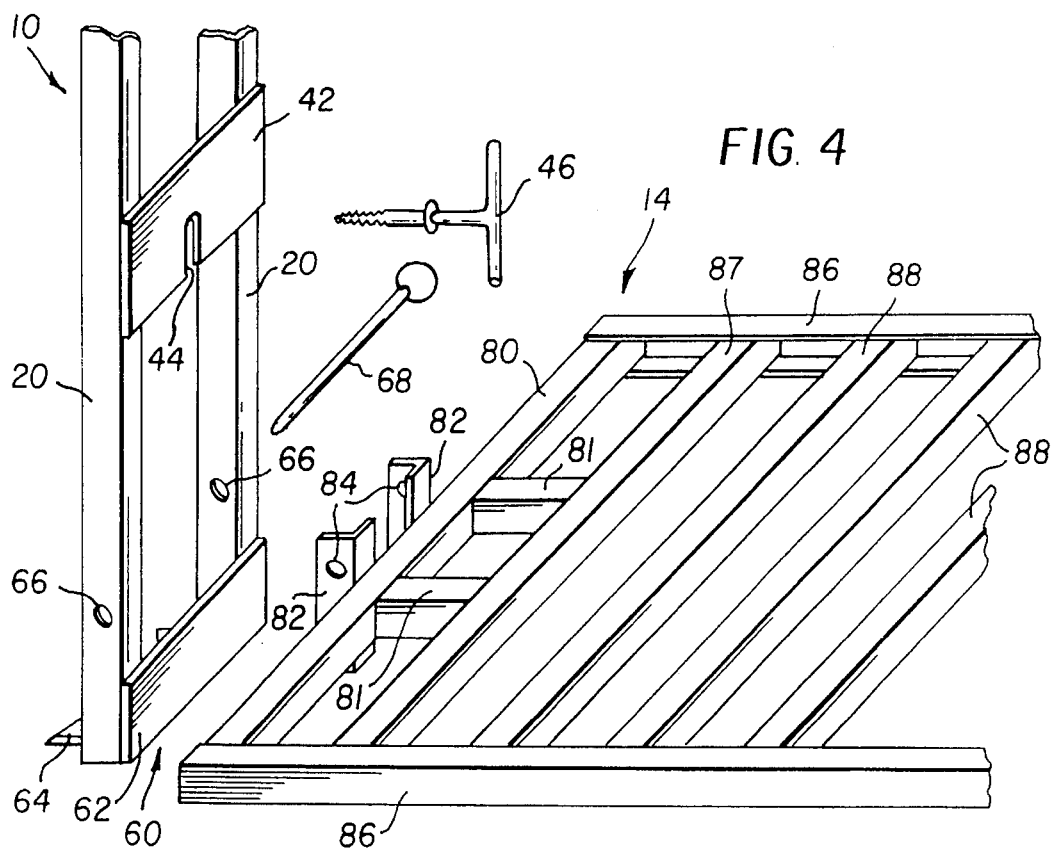

TREE STAND

FIELD OF THE INVENTION

A tree stand for use by hunters, outdoor enthusiasts and others that use elevated observation posts or work sites in their outdoor activities.

BACKGROUND OF THE INVENTION

Removable tree stands that mount to the trunks of trees and on which hunters and others can sit or stand at an elevation from ground level are well known. They have become very popular as a means to remain in wait for game animals that are sensitive to the presence of man in the woods or in open fields. They also can be useful as a work site for outdoor photography and other work functions that require extended periods of time, or on which equipment such as remotely activated video cameras can be mounted for extensive recording of outdoor events and happenings. Typically, tree stands comprise an attachment such as a metal collar, steel chain or flexible belt to tie around the tree trunk, a support stand on which the user may position himself, and often a seat above the support stand to enable the user to sit while positioned on the tree stand.

Various solutions have been attempted to make such stands relatively light weight to carry to the site locations, folding means to enable compact storage and various safety means to reduce the likelihood of injury to users. We believe the solutions of the prior art may compromise the effectiveness of the tree stands by reducing the overall load that such a stand safely can carry or by attaching the stand to a tree that does not ensure a firm attachment without the possibility of doing considerable damage to the tree.

We have invented a very useful tree stand that is able to carry a very heavy human or other load, is nevertheless demountable to enable it to be attached easily to a tree trunk, can be readily assembled and disassembled, and is capable of using alternate means for attachment to trees without doing irreparable damage to the trees.

It is therefore an object of this invention to provide a demountable tree stand that can carry heavy loads yet be easily disassembled, transported and mounted.

It is another object of this invention to enable alternate means to attach the stand to tree trunks to reduce tree damage.

It is yet another object of this invention to provide a tree stand made of readily available materials that is relatively easy and safe to mount and use.

SUMMARY OF THE INVENTION

In accordance with this invention, there is provided a compact, self-contained tree stand comprising a sturdy mounting bracket for secure attachment to a tree trunk or vertical post, a readily detachable stand connectable to the mounting bracket and capable of carrying a substantial load, a readily detachable seat connectable to the bracket, and means to secure the bracket to the tree trunk.

BRIEF DESCRIPTION OF THE DRAWINGS

The present invention will be more fully understood by reference to the following detailed description thereof and the attached drawings, in which like reference numerals refer to like elements, and wherein:

FIG. 2 is a side cross-sectional view taken on line 2—2 as shown in FIG. 1;

FIGS. 3 and 4 are partial exploded views of the embodiment of FIG. 1, showing the principal connecting means for the demountable seat and stand components, respectively; and FIGS. 5 and 6 are respectively, an isometric view of an alternate tree attaching means according to the invention and a cross sectional view of the alternate attaching means taken on line 6—6 of FIG. 5.

DESCRIPTION OF THE PREFERRED EMBODIMENT

Figure 1:
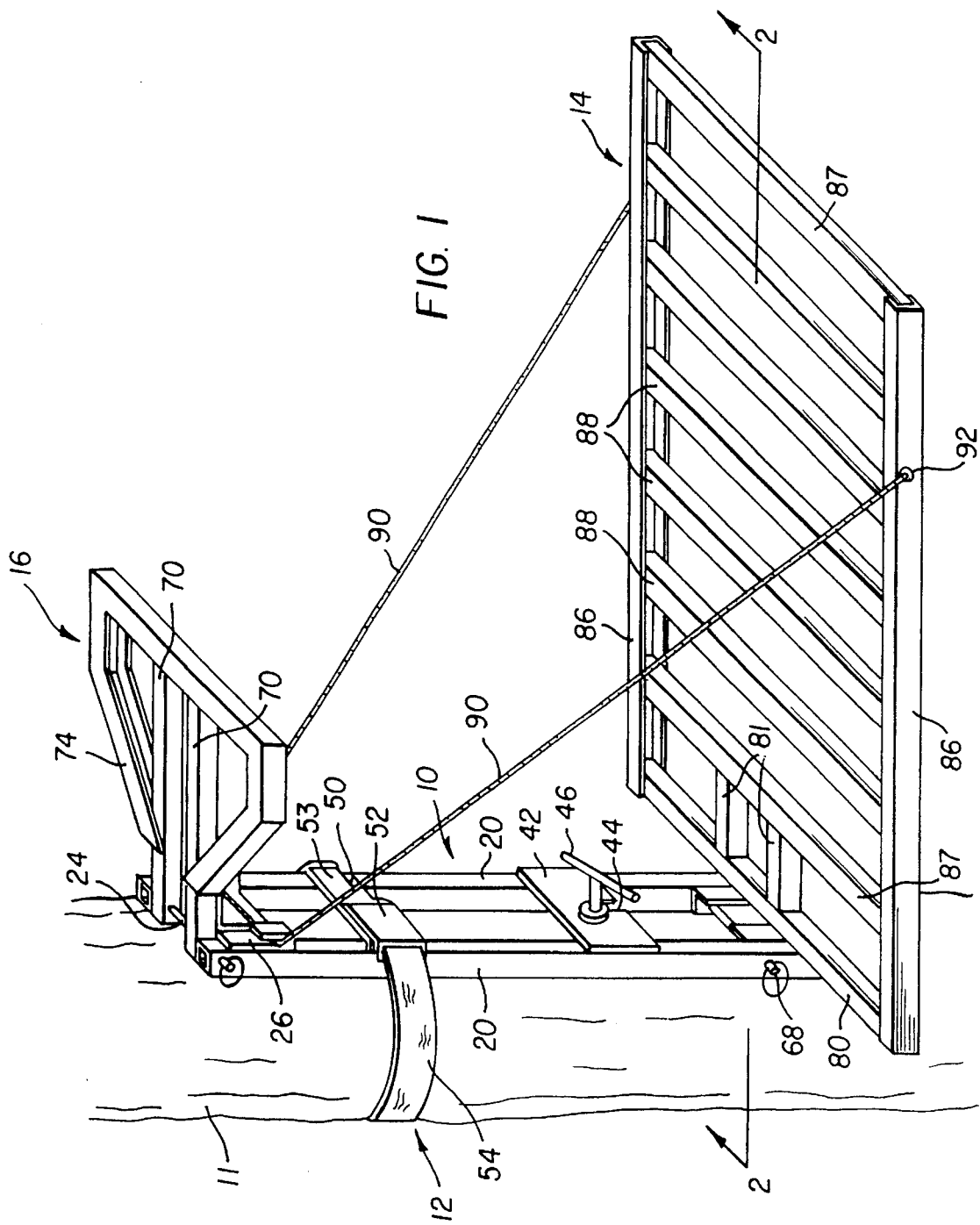
FIG. 1 is an isometric view of a preferred embodiment of this invention, showing the front, right and top sides of the tree stand.

Referring to FIG. 1, a preferred embodiment of a tree stand according to the present invention comprises a tree or pole mounting bracket 10, a cinch belt assembly 12 to attach the bracket 10 to the trunk 11 of a tree or to a vertical pole, a detachable weight supporting platform 14, and a detachable seat 16.

Mounting bracket 10 comprises two parallel, vertical support bars 20 each made preferably of about 1"×1"×⅛" thick square aircraft strength structural aluminum tubing and about 24 inches in length. Vertical supports 20 are permanently joined together about 4" apart by welding or the like (as is well known to those skilled in the art of permanently joining structural aluminum parts) at their tops, mid sections and bottoms as will be described. Referring now to FIG. 3, each of the supports 20 include at their topmost portions a pair of holes 22 in alignment with each other to receive a removable ¼" diameter stainless steel quick release safety pin 24 to detachably retain the seat 16 as will be described. Pin 24 requires sufficient shear strength to support the seat 16 and a load on the seat. A suitable pin is the quick release pin supplied by Aerofast, Inc. of Carol Stream, Ill., under its catalog No. C4-60R-303 "Faspin".

Immediately below the holes 22 is an upper connecting bracket portion 26 of extruded aluminum from about ³⁄₁₆–¼" thick which according to our invention comprises a vertical section 28 welded at the front surfaces of the supports 20, a rearwardly projecting horizontal portion 30 with its back edge notched at about a 15-degree angle to form a wedge 32 with two end points as shown to engage or "bite" into the tree trunk 11 or pole on which the stand is to be mounted. As shown by FIG. 2, the edge of wedge 32 preferably is chamfered to a narrow point to increase the bite to the tree trunk. Integral with and at the lower end of bracket portion 26 are two U-shaped hanger sections 38 also welded to the front surfaces of supports 20 to receive a flexible cable support for platform 14 as will be described.

Approximately midway between the upper and lower ends of supports 20 is a flat rectangular connecting plate 42 also about ³⁄₁₆" thick welded to the front sides of supports 20. Plate 42 includes a centered slot 44 open at its bottom and extending vertically about halfway up through plate 42 and through which is passed a T-screw 46 which may be used together with the belt assembly 12 to detachably hold the bracket 10 to the tree by hand screwing T-screw 46 through slot 44 and into the wood of the tree trunk 11. As can be seen, T-screw 46 includes an integral stop collar between the threaded end and the T-handle to engage plate 42 and thus limit the depth of insertion of the T-screw 46 into the trunk 11.

Positioned between connecting-plate 42 and bracket portion 26 is the cinch belt assembly 12, the buckle end 50 of which is riveted to both supports 20, and the strap 54 of which is positioned to wrap around a tree trunk or pole and fixed by the metal hook 53 at its free end to the buckle end 50 and winched tight and locked in place by its pivoted buckle locking portion 52. Belt assembly 12 may be of any well known and available winch type that can suitably hold a substantial load, but one we have found quite satisfactory is the winch belt made available by the Seat-a-Tree, Inc. of Warren, Mich. under its Model No. OCB-94 (part No. 34-A), and with its woven nylon belt has a rating of at least 4000 pounds break resistance. However, because the belt assembly 12 is wrapped around the tree trunk 11 in reverse of the manufacturer's normally intended use, we have found it necessary to modify the metal hook 53 by cutting its sides to fit within the channel formed within buckle end 50.

At the bottom ends of supports 20 is a lower connecting portion 60 which comprises an L-shaped angle bar also about 3/16" thick with a vertical side 62 welded to the front surfaces of supports 20 as shown and a horizontal side 64 extending rearwardly between supports 20 and formed at the rear by a second notched wedge formed substantially identically as the wedge 32 of the top connecting portion 26. Supports 20 above the lower connecting plate 60 each include a second set of transverse holes 66 to receive a second stainless steel quick release retaining pin 68, identical to pin 24, to detachably retain the platform 14 as will be described.

Further according to our invention, seat assembly 16 includes two seat supports 70 of square 1"×1"×1/8" thick extruded aluminum tube shaped bars 70, each of which is welded to the top horizontal leg of angle bracket 40. Seat supports 70 at their rear ends include a set of holes 72 that mate with holes 22 of bracket supports 20 to receive the safety retaining pin 24. Seat 16 otherwise can be made of any convenient shape, but we have shown it here to be made of a single length of 1"×1"×1/8" aluminum angle bar notched, bent and welded together into the shape as shown at 74 in FIG. 1 and to tubing lengths 70 as shown.

Referring now to FIGS. 1, 2 and 4, platform 14 preferably is made of two parallel, longitudinal U-channels 86 of 1"×1"×1/8" thick structural aluminum with their open sides inwardly facing each other to receive at their ends closest to the mounting bracket 10 the end portions of a transverse inner connecting member 80 made of a 3/4"×3/4"×1/8" thick square cross section structural aluminum tubing. At their opposite ends the U-channels 86 similarly receive an outer connecting member 87 of the same material as member 80. At the outer surface of member 80 are welded two vertical connectors 82 made of about 1"×1"×1/8" structural aluminum angle bars positioned and spaced such that their free sides face outwardly and rearwardly as shown to fit between and snugly against the inner sides of supports 20 as shown in FIG. 1. As is seen from FIG. 2, connectors 82 extend below member 80 such that their lower portions fit directly behind and snugly against the rear side of the vertical leg 62 of the lower bracket connector 60. Connectors 82 also extend upwardly above member 80 and contain holes 84 which when the platform 14 is mounted on lower bracket connector 60 are aligned with the holes 66 of bracket supports 20 to receive removable retaining pin 68. Each of pins 24 and 68 suitably includes a finger ring as shown for easy removal. To avoid misplacement, and although not shown, each pin 24, 68 can be connected to the bracket 10 by a lightweight flexible chain or line connected at one end to a support 20 and at the other to a pin ring.

A sturdy platform 14 according to our invention includes additional transverse U-channels 88 of 3/4"×3/4"/1/8" thick structural aluminum spaced sufficiently close together for safe standing, and a pair of structural strengthening bars 81 welded between and made of the same material as connector 80 and inner connector 87, which bars 81 when the platform 14 is carrying a load are stressed in compression against bracket connector 60 and supports 20. Further according to our invention, a pair of plastic coated aircraft cables 90 (for example Part No. 34114-54-11 supplied by Sanlo Manufacturing Company of Michigan City, Ind. and each rated at 920 pounds tension) are attached by structural rivet pins or shoulder screws 92 to U-channels 86 and are joined at their other end to a 5/16" stainless steel rod 94 by structural rivets or shoulder screws 96. When the platform 14 is attached to the bracket 10, rod 94 is placed inside U-channels 38 of the upper connector 26 as shown in FIGS. 1 and 2 and provides tensile support to the platform 14 when carrying a load. A non-skid coating of any known kind can also be applied to the top surfaces of platform 14.

During normal storage and transport, the bracket 10, platform 14 and seat 16 are detached from each other so the unit can be compactly stored and carried. In operation, when a suitable tree or post is located, the bracket 10 is held vertically against the tree trunk 11 at the desired height above ground and belt 54 is wrapped around the trunk 11 and connected to buckle 50 by its metal hook end 53 and cinched tight by closing the pivoted buckle end 52. T-screw 46 is then passed through slot 44 of the middle connector 42 and screwed into the trunk until its collar is pushed tightly against the outer surface of connector 42. Rod 94 attached to the cables 90 is then inserted in the channels 38 and angles 82 placed over the top of and behind leg 62 of lower connector 60. To retain the platform 14 in position, pin 68 is then inserted through holes 66 and 84. Similarly, the vertical leg of angle 40 on seat 16 is positioned against the front surface of connector 26 its holes 72 aligned with holes 22 of supports 20 and pin 24 inserted.

As is convenient for users of our tree stand, the bracket 10 may be left on the tree for any suitable length of time as for example a full hunting season, and the platform 14 and seat 16 removed between uses. If it is desired to retain the platform 14 on the tree between uses, it is possible to significantly reduce its visibility and use by birds and the like to retain it vertically against the tree trunk 11 either by inverting it and holding its top surface against the tree trunk 11 and realigning the holes 84 and 66 and the pin 68 reinserted to hold the platform 14 flat against the tree trunk 11 and below bracket 10, or simply by removing pin 68 and permitting the platform 14 to hang vertically from hangers 38 by cables 90. Seat 16 similarly can be pivoted upwardly against the tree trunk 11 to be held as by a detent in connector 30 (not shown) or tied to the tree trunk by a flexible tie line. Also it is possible to attach a number of brackets 10 to different trees for use during the entire hunting season and use only one set or fewer sets of stands 14 and seats 16 when moving position from tree to tree over the season.

As shown in FIGS. 5 and 6, and as an alternate bracket attachment in lieu of T-screw 46 162 where such screws may not be desirable or not permitted to be used, or on frozen or hard wood trees, we have devised an alternate supporting means 100 for bracket 10 made from a structural aluminum U-channel member 102 about 3"×3"×3/16" thick, the legs 104 of which about 1" in depth are notched and chamfered as are the connectors 28 and 60 to form tree engaging teeth 106. In this case, the channel member 102 is positioned vertically and a cinch belt 114 of the same type as belt assembly 50 is wrapped around the tree trunk and the belt 114 cinched tightly by its buckle 116. A bolt 110 which passes through the channel member 102 and belt 114 through hole 108 is fixed to them by lock nuts 111 and 113 then in use is passed through slot 44 of midconnector 42, and a knurl-faced hand turned knob 112 attached to the outer free end of bolt 110 turned to engage connector 42 tightly against the channel member 102.

As suitable sizes, the platform 14 can be between from about 25 to 28 inches in length (measured from the mounting bracket 10 outwardly) and from about 19 to 22 inches wide. The seat suitably can be about 10 inches long and about 12 inches wide. As described, a tree stand according to our invention can have a rated load of at least 400 pounds, even though its stand and seat can be readily detached, and still be relatively lightweight (about 7 to 9 pounds). Similarly, the three principal components of the tree stand can be readily mounted onto the tree trunk and to each other with only one hand while the other hand can be used for personal support. Especially during extended times while using the tree stand but not part of our invention, it nevertheless is recommended that any person standing at any height above ground level on the tree stand also use one of the many readily available, separate safety belts for personal security and safety.

It is to be understood that the aforementioned description is illustrative only and that changes can be made in the apparatus, in its components and their functions, as well as in other aspects of the invention discussed herein, without departing from the scope of the invention as defined in the following claims.

We claim:

1. A demountable tree stand comprising a mounting bracket, mounting means to attach the mounting bracket to the trunk of a tree, a weight supporting platform, and means to connect the platform to the mounting bracket, wherein the mounting bracket comprises two parallel, elongated supports, and the mounting means comprises (a) a connecting plate fixed to and connecting the supports substantially at the mid sections of both of the supports, the connecting plate defining a centered slot and (b) means passing through the slot to attach the connecting plate to the tree trunk, the means passing through the slot to attach the connecting plate to the tree trunk comprising(i) a U-shaped channel bracket with opposing legs, the legs being wedge shaped to frictionally engage the tree trunk, (ii) flexible belt means to removably attach the channel bracket to the tree trunk, (iii) a threaded bolt fixed to the channel bracket and passing through the slot, and (iv) a threaded knob on the bolt to tighten the mounting bracket against the U-shaped channel bracket.

2. A tree stand comprising:
   (a) a mounting bracket comprising at least two elongated vertical, spaced and parallel support bars; a middle connecting member fixed to both of the support bars substantially at the mid-sections of the support bars and including means to attach the bracket to the trunk of a tree, the support bars each having a back side facing the tree trunk and a front side facing away from the tree trunk; a lower connecting member fixed to both of the support bars substantially at the lower ends of the support bars to frictionally engage the tree trunk; and an upper connecting member fixed to both of the support bars substantially at the upper ends of the support bars to frictionally engage the tree trunk and including a hanger part;
   (b) a detachable weight supporting platform comprising a horizontal body portion with a back side and at least one connecting bar fixed to the back side of the body portion;
   (c) pin means to detachably retain the platform to the mounting bracket with the back side of the platform compressed against the lower connecting member; and
   (d) flexible cable means with two ends attached to the body portion of the platform at points substantially spaced from the connecting bar and the support bars, and a section of the cable means between the ends detachably held by the hanger part of the upper connecting member while the platform is attached to the mounting bracket;
   wherein the means to attach the mounting bracket to the tree trunk comprises a U-shaped channel bracket with opposing legs, the legs being wedge shaped to frictionally engage the tree trunk, flexible belt means to removably attach the channel bracket to the tree trunk, and tightening means detachably connecting the channel bracket to the middle connecting member to hold the mounting bracket against the U-shaped channel bracket and to frictionally engage the wedge shaped sides of both the lower and upper connecting members against the tree trunk.

3. The tree stand according to claim 2 and further comprising a seat section with a substantially horizontal seating body portion to support a seated person, at least one connecting bar extending rearwardly of the body portion and positioned between the support bars while the seat section is attached to the mounting bracket, and second detachable pin means to detachably retain the seat section on the mounting bracket.

4. The tree stand as recited in claim 2, wherein the weight supporting platform further comprises two substantially parallel, longitudinal U-channels extending outwardly of the mounting bracket with their open sides inwardly facing each other, and a plurality of parallel transverse connecting stand bars each having ends positioned within and fixed to the longitudinal U-channels.

5. The tree stand as recited in claim 2, wherein the lower connecting member and the connecting bar of the weight supporting platform are dimensioned to permit the platform to be inverted and the pin means to detachably hold the weight supporting platform vertically flat against the tree trunk and below the mounting bracket.

6. A compact, self-contained, transportable and easy and safe to operate tree stand comprising:
   (a) a mounting bracket comprising at least two elongated vertical, spaced and parallel support bars; a middle connecting member fixed to both of the support bars substantially at the mid-sections of the support bars and including means to attach the bracket to the trunk of a tree, the support bars each having a back side facing the tree trunk and a front side facing away from the tree trunk; a lower connecting member fixed to both of the support bars substantially at the lower ends of the support bars comprising an angle bar having a first side fixed to the front sides of the support bars and a second side extending between the support bars and rearwardly of the back sides of the support bars to frictionally engage the tree trunk; and an upper connecting member fixed to both of the support bars substantially at the upper ends of the support bars comprising an first part fixed to the front sides of the support bars, a second part extending between the support bars and rearwardly of the back sides of the support bars to frictionally engage the tree trunk, and a hooked hanger part extending from the first part forwardly of the support bars; the support bars each having means defining a first set of holes aligned axially with each other and located between the front and back sides of the support bars and between the middle and lower connecting members;

(b) a detachable weight supporting platform comprising a horizontal body portion with a back side, at least one vertical connecting bar fixed to the back side of the body portion and extending both above and below the back side, the portion of the connecting bar above the back side having means defining a hole axially aligned with the first set of holes of the support bars and the portion of the connecting bar extending below the back side positioned behind the first part of the lower connecting member;

(c) detachable pin means insertable in the first set of holes of the support bars and the hole of the connecting bar to detachably retain the platform to the mounting bracket with the back side of the platform compressed against the first part of the lower connecting member; and (d) flexible cable means with two ends attached to the body portion of the platform at points substantially spaced from the connecting bar and the support bars, a section of the cable means between the ends detachably held by the hooked hanger part of the upper connecting member while the platform is attached to the mounting bracket.

7. The tree stand according to claim 6 wherein the support bar hole defining means further define a second set of holes axially aligned with each other and positioned above the upper connecting member, the tree stand further comprising a seat section with a substantially horizontal seating body portion to support a seated person, at least one connecting bar extending rearwardly of the body portion and positioned between the support bars while the seat section is attached to the mounting bracket, the connecting bar defining a hole axially aligned with second set of holes of the support bars, an angle bar fixed to the seating body portion and having a side extending vertically below the seating body portion and engaging in compression the first part of the upper connecting member while the seat section is attached, and second detachable pin means insertable in the second set of holes of the support bars and the hole of the seat section connecting bar to detachably retain the seat section on the mounting bracket.

8. The tree stand as recited in claim 6, wherein the means to attach the mounting bracket to the tree trunk comprises a U-shaped channel bracket with opposing legs, the legs being wedge shaped to frictionally engage the tree trunk, flexible belt means to removably attach the channel bracket to the tree trunk, and tightening means detachably connecting the channel bracket to the middle connecting member to hold the mounting bracket against the U-shaped channel bracket and to frictionally engage the wedge shaped sides of both the lower and upper connecting members against the tree trunk.

9. The tree stand as recited in claim 6, wherein the weight supporting platform further comprises two parallel, longitudinal U-channels extending outwardly of the mounting bracket with their open sides inwardly facing each other, and a plurality of parallel transverse connecting stand bars each having ends positioned within and fixed to the longitudinal U-channels.

10. The tree stand as recited in claim 6, wherein the lower connecting member and the connecting bar of the weight supporting member are dimensioned to permit the platform to be inverted with the first set of holes of the support bars realigned with the hole of the connecting bar to hold the platform flat against the tree trunk and below the mounting bracket when the pin means is reinserted.

11. A field demountable tree stand comprising a mounting bracket with at least two elongate and substantially parallel vertical supports each having an upper end and lower end mounting means to attach the mounting bracket to the trunk of a tree with the entire mounting bracket substantially flush with and close to the tree trunk, a weight supporting platform and a seat section both of which platform and seat section are completely and quickly detachable from the mounting bracket for selective removal from the tree between uses, and first and second connecting means each comprising quick release pin receiving means in the mounting bracket and a manual, shear resistant quick release pin to enable complete removal of the platform and the seat section, respectively, from the mounting bracket wherein the pin receiving means of the first connecting means is substantially near the lower ends of both vertical supports, and wherein the first connecting means further comprises (a) a rigid hook substantially at the upper ends of the vertical supports, (b) a pair of flexible cables each fixed at one end to the platform at a point spaced substantially from the lower ends of the vertical supports, and (c) a rigid hanger bar connecting the other ends of the cables and removably held by the hook while the platform is connected to the mounting bracket.

12. The tree stand as recited in claim 11 wherein both the platform and the seat section extend substantially entirely in only a horizontal direction from the mounting bracket with no portion of either the platform or the seat section departing substantially vertically from the horizontal direction.

* * * * *